United States Patent [19]
Smallegan

[11] 4,442,584
[45] Apr. 17, 1984

[54] NUT INSTALLATION APPARATUS, METHOD AND CONTROLS

[75] Inventor: Jon M. Smallegan, Farmington Hills, Mich.

[73] Assignee: Multifastener Corporation, Detroit, Mich.

[21] Appl. No.: 397,946

[22] Filed: Jul. 13, 1982

Related U.S. Application Data

[63] Continuation-in-part of Ser. No. 118,931, Feb. 6, 1980, Pat. No. 4,348,796.

[51] Int. Cl.$^3$ .................. B23P 11/00; B23P 21/00; B23P 19/00
[52] U.S. Cl. .................................. 29/432; 29/716; 29/798
[58] Field of Search .................. 29/432, 432.1, 798, 29/243.53, 243.52, 243.5, 716, 707; 411/179

[56] References Cited

U.S. PATENT DOCUMENTS

| | | |
|---|---|---|
| 3,718,965 | 3/1973 | Steward ........................... 29/798 |
| 3,740,818 | 6/1973 | Grube .............................. 29/798 |
| 3,810,290 | 5/1974 | Grube .............................. 29/798 |
| 3,946,478 | 3/1976 | Goodsmith et al. ............ 29/798 |
| 3,946,479 | 3/1976 | Goodsmith et al. ............ 29/798 |
| 3,969,808 | 7/1976 | Goodsmith et al. ............ 29/798 |
| 3,971,116 | 7/1976 | Goodsmith et al. ............ 29/798 |
| 4,124,050 | 11/1978 | Ackerman ...................... 29/798 |
| 4,153,989 | 5/1979 | Shinjo ............................. 29/798 |
| 4,242,793 | 1/1981 | Matthews et al. .............. 29/798 |

*Primary Examiner*—Howard N. Goldberg
*Assistant Examiner*—Steve N. Nichols

*Attorney, Agent, or Firm*—Cullen, Sloman, Cantor, Grauer, Scott & Rutherford

[57] ABSTRACT

A nut installation apparatus or head and controls for installing self-attaching nuts, such as pierce nuts, in a panel, without the requirement of a large forming die press assembly. The apparatus includes a nut anchor, which holds the first or end nut stationary, a relatively movable die member, opposite the nut anchor, which supports the panel and a resiliently supported nut guide having a passage receiving nuts in bulk or strip form. The panel is biased into contact with the end nut in the nut guide, by the movable die, to install the nut in a panel. The moveable die is impelled toward the nut anchor by means of a two stage piston assembly having a first stage which supplies pressure limited to the elastic limit of the panel, and a second stage which supplies sufficient pressure to pierce the panel with the end nut. A sensor and switching mechanism is integrated with the apparatus controls to assure proper installation of the nut and prevent damage to the apparatus. The nut anchor is of generally L-shape configuration to provide a rugged construction, to stop-forward movement of the nut along the nut passage and to retain the nut in a fixed aligned position during installation. The apparatus controls contain a dual palm button starter which requires simultaneous actuation by the operator's palms or thumbs, preventing the operator's limbs from coming in contact with the apparatus during use. Where the nuts are in strip form, the apparatus first severs the end nut from the strip and then attaches the nut in the panel, in a separate step.

12 Claims, 15 Drawing Figures

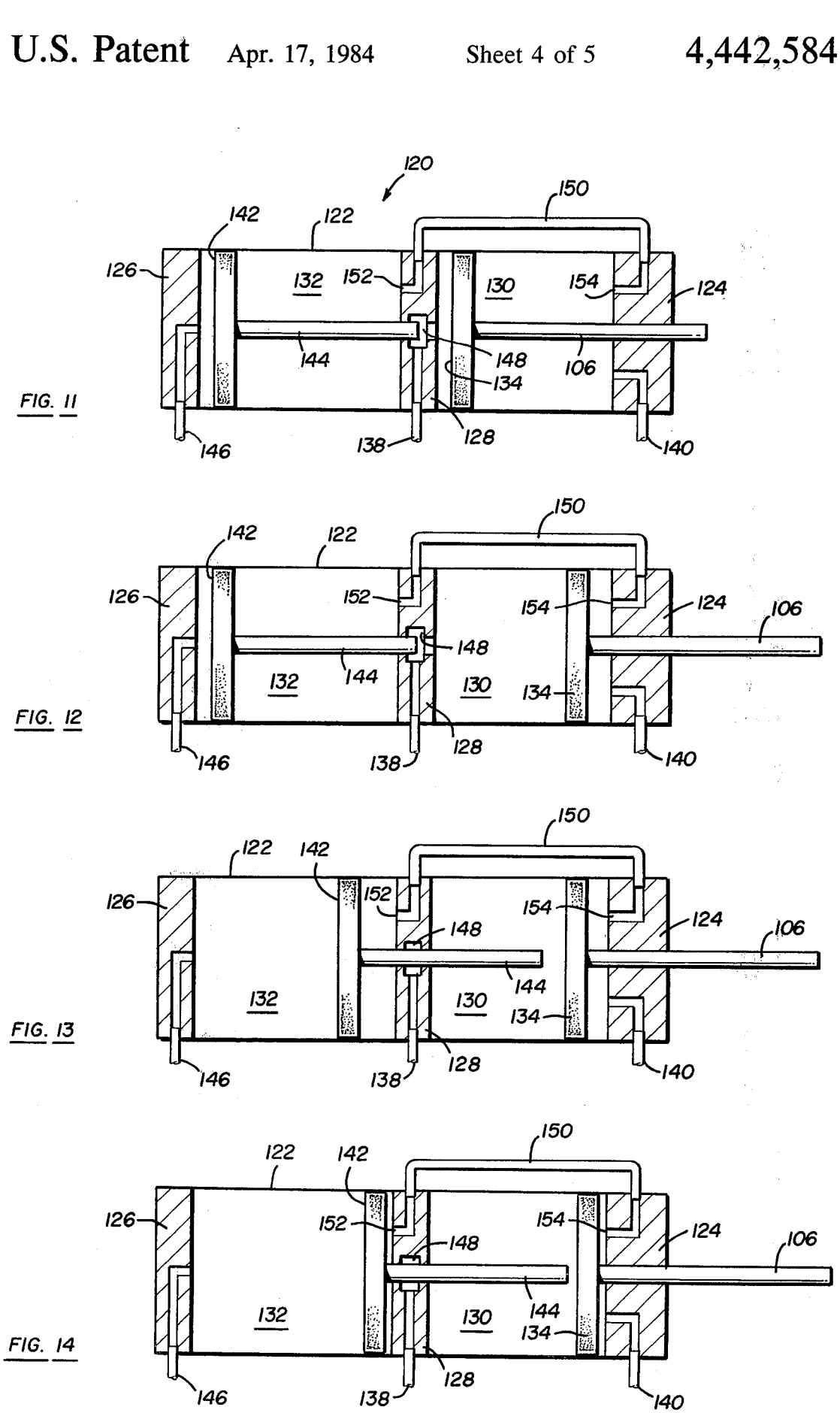

NUT INSTALLATION APPARATUS, METHOD AND CONTROLS

The present application is a continuation-in-part of application Ser. No. 118,931, filed Feb. 6, 1980, now U.S. Pat. No. 4,348,796.

FIELD OF THE INVENTION

This invention relates to a fastener installation apparatus for installing self-attaching nuts to a panel, such as pierce and clinch nuts and the controls therefore which include a sensor and switching mechanism. The apparatus may be used to attach nuts in bulk or strip form.

DESCRIPTION OF THE PRIOR ART

Installation heads for pierce and clinch nuts generally include a passage receiving the nuts, a transverse plunger passage having a reciprocating plunger and feed means feeding nuts from the nut passage, beneath the plunger, and installing the nuts in a panel located beneath the plunger. Present installation heads are generally designed to accommodate pierce or clinch nuts in either bulk or strip form. In the strip form, adjacent nuts are interconnected by frangible connector means, which may be separate connectors or integral with the nuts.

Pierce nuts generally include a projecting rectangular pilot portion which pierces a hole in the panel. The panel is then deformed into nut grooves adjacent or beneath the pilot as shown in U.S. Pat. Nos. 3,648,747 and 2,707,322, assigned to the assignee of this application. The piercing and installation force is provided by the plunger, which reciprocates within the pierce nut installation head as described above. A die member is provided beneath the plunger opening, which supports the panel, and which deforms the panel into the nut grooves. In a pierce nut installation head, the die includes an opening configured to receive the slug pierced from the panel. The die may also deform the nut to overlie the panel as shown in U.S. Pat. Nos. 2,750,660 and 2,799,188, which patents are assigned to the assignee of the present application.

In commercial pierce and clinch nut applications, the installation heads are located in a panel forming die press, such as used by the automotive industry to form automotive body panels. The nuts are installed with each stroke of the press. The plunger is fixed to one die press member and the die is fixed to the other. Thus, the plunger piercing force is supplied by the die press, which typically generates about twenty to one thousand tons of pressure.

The need, therefore, remains for a simple pierce and clinch nut installation apparatus and controls thereof having its own source of power, which can be used in applications where a large die press is not available. The pierce nut installation apparatus of this invention operates from conventional air line pressure which supplies the necessary force to drive a two stage piston assembly. The apparatus is quiet, reliable and simple in construction and use.

SUMMARY OF THE INVENTION

The pierce nut installation apparatus of this invention is particularly adapted for securing self-attaching nuts, such as pierce or clinch nuts, on a panel. As described above, pierce nuts have a projecting pilot adapted to pierce its own hole in the panel and form a mechanical interlock with the panel, such as disclosed in U.S. Pat. No. 3,648,747, referred to hereinabove. The apparatus of this invention includes a nut anchor, which holds the first or end nut stationary, a relatively movable die member, opposite the nut anchor, which supports the panel and a nut guide having a passage for receiving the nuts in strip or bulk form, including a bottom wall supporting the nuts received within the passage. In bulk form, the nuts are received in the nut passage, aligned for installation, with the nut pilots projecting downwardly to pierce the panel. In strip form, the nuts are interconnected by frangible connector means, which may be separate or integral with the nuts.

The end nut is held stationary by the nut anchor located adjacent to the end of the nut passage and forming part of the top wall of the passage. The nut anchor is configured to hold the end nut fixed against vertical movement, while permitting the remaining nuts in the passage to move vertically in the nut guide. A movable die member is located opposite the nut anchor. In the nut installation apparatus of the present invention, the die member is movable under pressure toward the nut anchor and the nut anchor is fixed, which results in unexpected advantages in a nut installation head, as described below. The die supports the panel and moves the panel into engagement with the end nut and the nut guide. The nut anchor includes a pocket or downwardly facing opening.

In the preferred embodiment of the nut installation head of this invention, the nut anchor is of generally L-shaped configuration having a pocket or downwardly facing opening forming part of the top wall and the end of the nut passage. The pocket prevents movement of the end nut during installation which is essential for proper piercing and locking of the end nut on the panel. The L-shape configuration of the nut anchor provides a single unit assembly eliminating the necessity of additional members.

A spring means resiliently supports the nut guide for vertical movement relative to the nut guide. In the disclosed embodiment, the spring means is provided by a resilient compressible pad, such as polyurethane foam. Where the nuts are received in strip form, including frangible connector means, the initial movement of the nut guide, relative to the end nut, beneath the nut anchor, fractures or cuts the frangible connector means. This movement can be sensed and used to control the final piercing and clinching operations by means of a sensor and switching mechanism.

In the preferred embodiment of the nut installation head of this invention, the die member is supported by a two stage piston assembly. The first stage, moves the die and the supported panel into engagement with the end nut located beneath the nut anchor. The contact pressure is preferably sufficient to move the nut guide vertically relative to the nut anchor and sever the frangible connector means. The panel need not be permanently deformed. As described, this slight movement of the nut guide may be sensed by a pneumatic sensor and switching mechanism which will stop the press if the end nut is not properly aligned beneath the nut anchor. If the end nut is properly aligned, the nut guide moves vertically and severs the frangible connector means.

The second piston stage forces the die and panel into deforming engagement with the end nut, locking the nut on the panel. In a typical application, the die includes projecting locking lips which deform the panel into grooves in the pierce nut. A slug, pierced from the panel by the nut pilot, is received through an opening in the die member. In the disclosed embodiment, the second stage provides sufficient force to pierce a panel and lock the nut on the panel. The required force will, of course, depend upon the nut configuration and the thickness of the panel. In the preferred embodiment, the second stage of the piston is actuated by the sensor and switching mechanism only if the end nut is properly located beneath the anchor.

The incorporation of a sensor and switching mechanism, in the preferred embodiment, protects the apparatus and end nut from damage caused by the misalignment of the end nut. If the end nut is not aligned properly, no damage will result due to the fact that the first stage exerts a pressure limited to the elastic limit of the panel. The sensor and switching mechanism may also be used where nuts are fed in bulk form, because the nut guide will not move relative to the nut anchor where the end nut is only partially located beneath the nut anchor.

An optional stripper pin facilitates the release of the panel from the die member. In the disclosed embodiment, the stripper pin is incorporated into the face of the movable die member. The stripper pin exerts a force against the panel slightly biasing the panel away from the movable die.

The method of attaching self-locking nuts to a panel of this invention thus includes: supporting the panel on a movable die opposite a stationary nut anchor; disposing a nut between the nut anchor and the panel; and moving the die toward the anchor into engagement with the end nut. Where the nuts are interconnected by frangible connector means in a strip, the end nut is first detached from the strip by holding the end nut and biasing the remaining nuts vertically, breaking the frangible connector means. Where the nuts are in bulk form, the end nut is held in the pocket in the nut anchor and the guide is moved vertically. The nut anchor may be magnetic to hold the end nut in place or mechanical means may be provided as disclosed in the prior art.

As described, the end nut is permanently secured to the panel preferably in a separate step. In the preferred method, the initial vertical movement of the nut guide is sensed, indicating that a nut is properly located beneath the nut anchor, ready for installation. The panel is only slightly deformed, preferably within it elastic limit, permitting relocation of the panel if the end nut is not ready for installation. If the nut is ready, the second stage of the piston is actuated and the panel is deformed into locking engagement with the end nut. When the method and apparatus of this invention is utilized to install a pierce nut, the nut pilot pierces its own hole in the panel and the die deforms panel portions into locking grooves in the nut.

The controls for the nut installation apparatus or head for installing self attaching nuts include a series of valves, the sensor and switching mechanism and a dual palm button starter. The dual palm button starter actuates the apparatus by being simultaneous actuated by the operator's palms or thumbs. The requirement of simultaneous actuation prevents the operator's limbs from coming in contact with the movable die member, nut anchor or nut guide during use. The controls are quiet, quick and provide a safety feature both for the operator and apparatus.

The method of attaching nuts to a panel, the apparatus and controls of this invention are thus simple in construction and use. The installation apparatus includes its own source of power, eliminating the requirement for a large die press, as described above. The apparatus is quiet in operation, particularly compared to a large die press. Further, the disclosed embodiment of the nut installation apparatus of this invention may be operated from a conventional air line available in most manufacturing facilities. Other advantages and meritorious features of the invention will be more fully understood from the following Description of the Preferred Embodiments, the claims and the appended drawings, a brief description of which follows.

BRIEF DESCRIPTION OF THE DRAWINGS

FIG. 11 is a cutaway schematic view of the two stage piston assembly showing the positions of the pistons when unactuated.

FIG. 12 is a cutaway schematic view of the two stage piston assembly showing the positions of the pistons upon completion of the first stage.

FIG. 13 is a cutaway schematic view of the two stage piston assembly showing the positions of the pistons during the second stage.

FIG. 14 is a cutaway schematic view of the two stage piston assembly showing the positions of the pistons upon completion of the second stage.

DESCRIPTION OF THE PREFERRED EMBODIMENTS

Figures 1, 2:
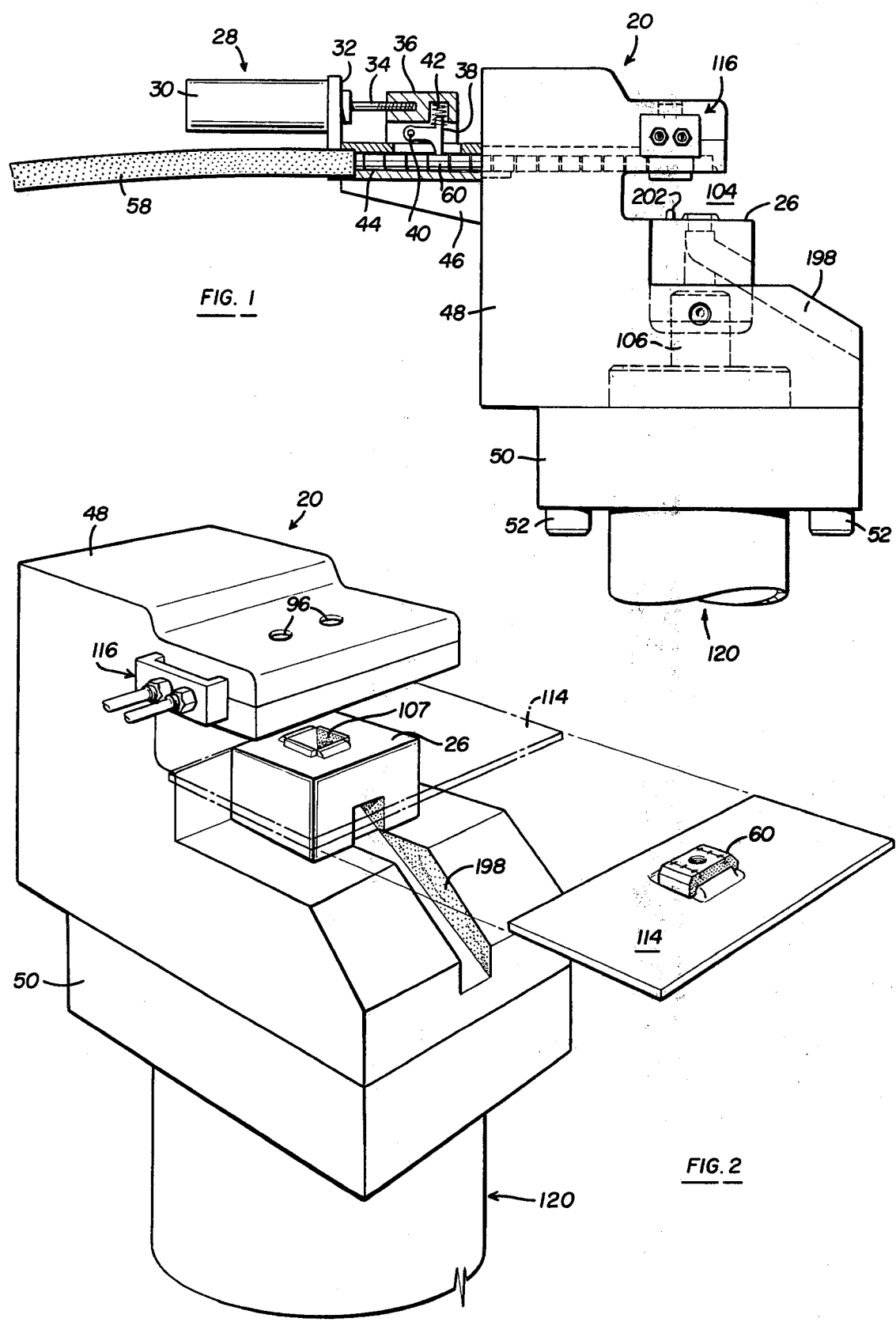
FIG. 1 is a side elevation of one embodiment of the nut installation apparatus of this invention.
FIG. 2 is a side elevation of the nut installation apparatus shown in FIG. 1, with a nut and panel assembly, which may be formed by the disclosed apparatus.

The nut installation apparatus or head for installing self-attaching nuts, such as pierce nuts, in a panel, is shown generally as 20 in FIGS. 1 and 2. The apparatus includes a resiliently supported nut guide 22, a nut anchor 24, which holds the first or end nut stationary, and a relatively movable die member 26, opposite the nut anchor 24 as shown in FIGS. 4, 5, 6 and 7.

Pierce or clinch nuts are fed to the head by a conventional feed mechanism or chucker 28. The feed mechanism 28 includes a piston-cylinder 30, which is secured to the housing by clamp 32. The piston 30 may be pneumatically actuated as disclosed, or hydraulically actuated. The piston rod 34 is threaded to a feed head 36. The feed head 36 includes a pawl 38, which is pivotally connected to the head at 40, and resiliently biased by spring 42 into a nut bore. Extension of the piston rod 34 thus feeds nuts into the nut passage 44. When the piston rod 34 and feed head 36 are retracted, the pawl 38 is biased into the head 36, out of engagement with the nuts, permitting return of the head 36 for feeding further nuts. The nut channel or passage member 44 is supported on the housing in the disclosed embodiment by brace member 46.

Figure 3:
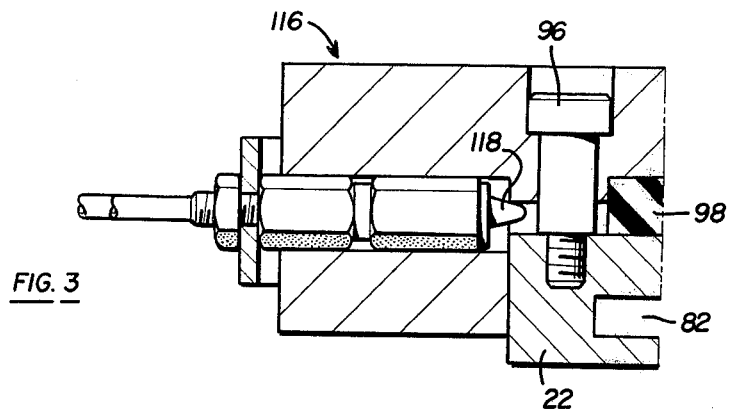
FIG. 3 is a fragment, cross-sectional side view, of the nut installation apparatus as shown in FIG. 1, containing the sensor and switching mechanism.
Figure 4:
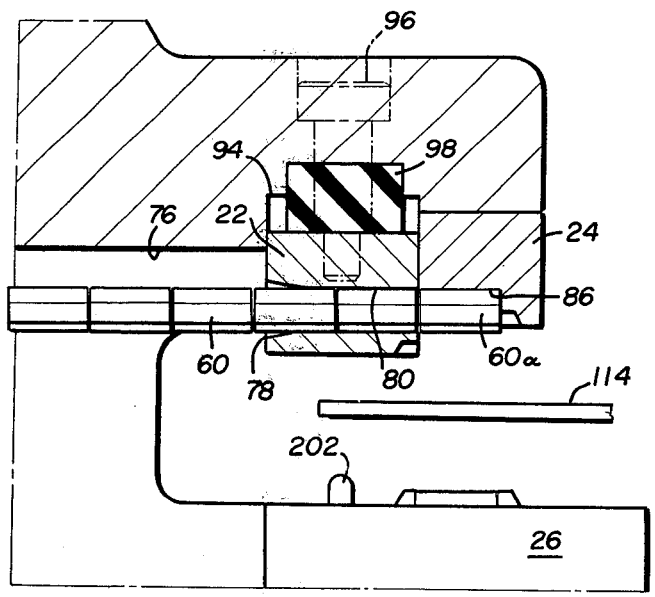
FIG. 4 is a side view, partially cross-sectioned, of the nut installation apparatus shown in FIG. 1, with the die assembly open.
Figure 9:
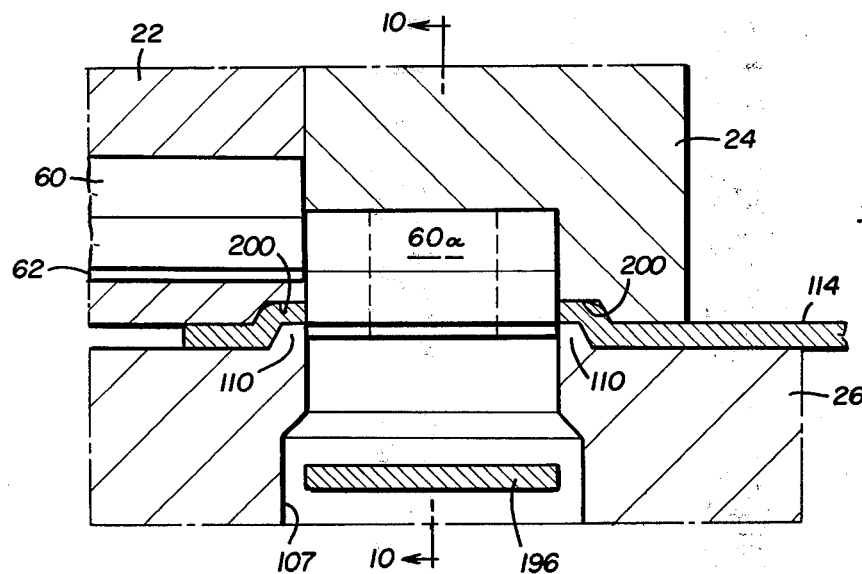
FIG. 9 is an enlarged side cross-sectional view of the nut installation head of FIG. 1, with the nut and panel assembly.
Figure 10:
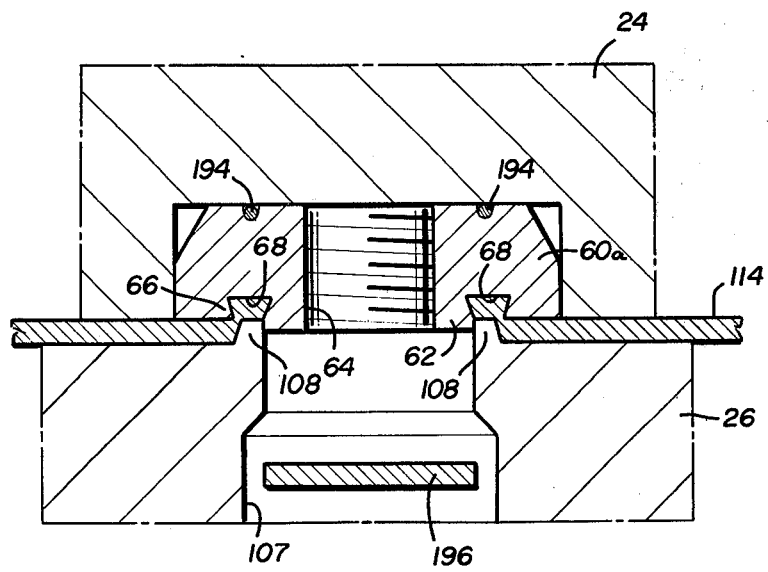
FIG. 10 is a cross-sectional view of FIG. 9, in the direction of view arrows 10/10.

In the disclosed embodiment, the nut installation housing is composed of a C-shaped frame 48. The housing section is secured to frame support 50 by shoulder bolts 52 or other means. The nuts 60 are received in the nut passage 44 preferably through conventional C-shaped plastic chuting 58. As described, the nuts 60 may be received in bulk or strip form. Further, the preferred configuration of the nut will depend upon the specific application. For example, the nuts may be universal pierce nuts, as disclosed in U.S. Pat. No. 2,707,322, in bulk form or interconnected by frangible wires, as disclosed in U.S. Pat. No. 3,711,931. In the disclosed embodiment, the nuts 60 are generally rectangular in cross section, having a rectangular projecting pilot portion 62, as shown in FIGS. 9 and 10, a central threaded bore 64, opposed lateral flange portions 66, and parallel reentrant grooves 68 defined in the flange portions, on opposed sides of the pilot. A more detailed description of the pierce nut shown in FIGS. 9 and 10 may be found in the U.S. Pat. No. 3,648,747. As shown in FIGS. 3 and 4, the pierce nuts are received within the housing through nut passage 76 into the movable nut guide 22. The nut guide includes a bottom wall 78, a top wall 80 and a transverse rectangular passage 82 which receives the nuts 60. In the disclosed embodiment, the nut anchor 24 is L-shaped, having the same configuration as the pierce nuts and the transverse rectangular passage 82 in the nut guide. Further, as shown in FIG. 4, the nut anchor 24 has a pocket 86 configured to receive one of the nuts and communicating with said passage 82. The pocket 86 prevents movement of the end nut 60a, received beneath the nut anchor 24, during movement of the nut guide 22. The nut anchor 24 holds the nut in a fixed position during installation of the nut.

The nut guide 22 is received within a rectangular opening 94 in the housing, permitting vertical movement of the nut guide. In the disclosed embodiment, guide bolts 96 retain the nut guide 22 within the opening 94, while permitting vertical movement of the nut guide, as shown in FIGS. 3 and 4. A spring means 98 resiliently biases the nut guide 22 outwardly, but permits vertical movement, as described. In the disclosed embodiment, the spring means 98 comprises a resilient, compressible pad, such as a rectangular pad of polyurethane foam. It will be understood, however, that other materials may be used, including a mechanical spring. It is further understood that upwardly and downwardly are relative terms and are used herein to describe the embodiment shown in the drawings only.

Figure 8:
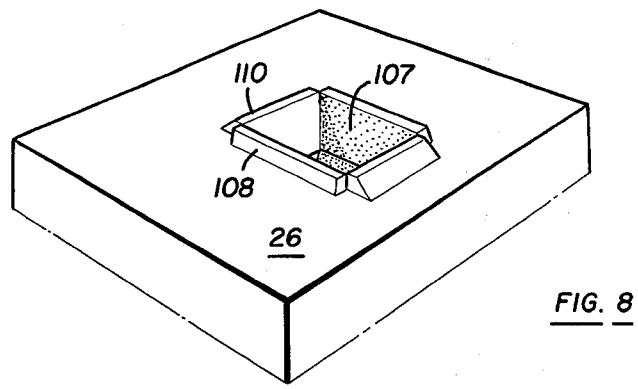
FIG. 8 is a top perspective view of the die shown in FIG. 1.

A movable die member 26 is disposed within the C-shaped opening 104 in the housing as best shown in FIGS. 1 and 2. The die member 26 is supported on a piston rod 106, as shown in FIG. 1. The die member 26 includes a rectangular opening 107, see FIG. 8, and opposed projecting pairs of clinching lips 108 and 110. The panel 114, which is to receive a pierce nut 60, is supported on the die member 26, within the C-shaped opening of the head. As described above, the die member 26 and the supported panel 114 are moved upwardly to engage a pierce nut in the installation head, forming the nut and panel assembly of FIG. 2. In the preferred embodiment, the nut and panel assembly are formed in two distinct steps, as now described.

Figure 5:
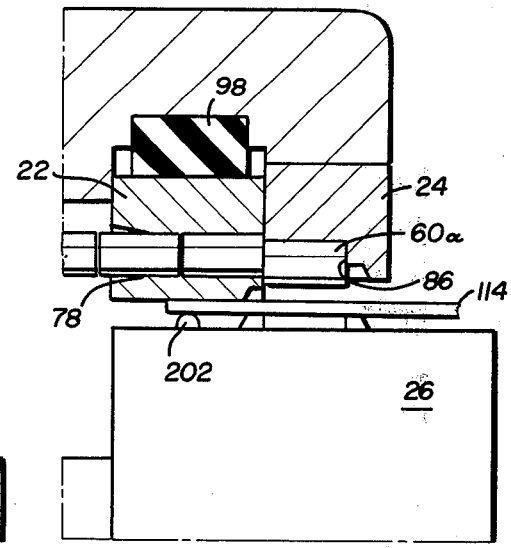
FIG. 5 is a side view, partially cross-sectioned, of the nut installation apparatus as shown in FIG. 4, with the frangible connector means fractured or cut.
Figure 6:
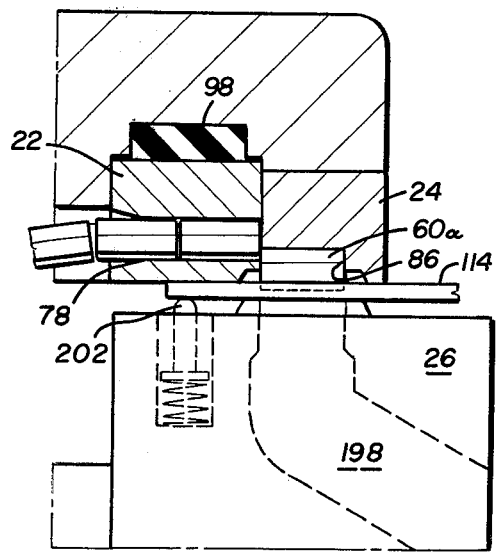
FIG. 6 is a side view of the nut installation head, partially cross-sectioned as shown in FIG. 4, with the die assembly closed, and the first piston stage completed.

The die member 26 is first closed as shown in FIG. 5 to engage the panel 114 against the first or end nut 60a and the bottom wall 78 of the movable nut guide. The die pressure is preferably limited substantially within the elastic limit of the panel 114. The end nut 60a is held stationary against the panel 114 by the nut anchor 24, flexing the panel 114 on opposed sides of the end nut 60a. The flexure of the panel 114 lifts the nut guide 22 against the resilient pressure of spring means 98, as shown in FIGS. 5 and 6. As described, the movement of the nut guide is guided in the disclosed embodiment by guide bolts 96, see FIGS. 3 and 4. The upwarm movement of the nut guide is sensed by a sensor and switching mechanism 116 located in the apparatus head, see FIGS. 1, 2 and 3. If a nut is only partially located beneath the nut anchor 24, the nut guide 22 will not be lifted as shown in FIG. 6, and the piston will not be actuated to form the nut and panel assembly described hereinbelow.

In the preferred embodiment, the sensor and switching mechanism 116 as shown in FIG. 3 is operated by standard air line pressure. The sensor switch 116 is actuated when the sensor knob 118 comes in contact with the nut guide 22. As described, as the nut guide 22 is raised, during the first stage, the corner of the guide 22 contacts and depresses the sensor knob 118 only if the end nut is properly aligned; the sensor 116 initiates the second stage locking the end nut on the panel. A suitable sensor and switching mechanism of the type shown in FIG. 3 is available commercially from Mead Corporation.

A two stage piston assembly suitable for the nut installation head of this invention is disclosed in U.S. Pat. Nos. 3,875,365 and 4,099,436, the disclosures of such patents are incorporated herein by reference. As decribed therein, the piston may be operated from a conventional air line, normally available at 60 to 100 psi. The first stage merely extends the piston by air line pressure in combination with a fluid. In the disclosed embodiment, the cylinder is approximately three and a half inches in diameter, creating a die pressure of about 500 to 800 psi. This pressure is sufficient to close the die and flex the panel 114 to raise the nut guide 74, as shown in FIGS. 5 and 6 and described above. The second stage of the piston is hydraulically augmented, as disclosed in the above-referenced patents, creating a die pressure of about 4 to 8 tons. This force is sufficient to form the nut and panel assembly described hereinbelow.

As shown in FIG. 1, the two stage piston assembly 120 is located within the C-shaped frame 48, opposite the movable die member 26 with the piston rod 106 extending therefrom. In the disclosed embodiment in FIGS. 11 to 14, the two stage piston assembly 120 includes a cylindrical housing 122 having the ends thereof closed by an open end plug 124 and closed end plug 126. The cylindrical housing 122 is divided into two compartments, by means of an intermediate plug 128, forming chambers 130 and 132. Chamber 130 is provided with a working piston 134 having a piston rod 106 which is slidably movable through plug 124. Piston rod 106 extends through the plug 124 to the outside of the cylindrical housing 122, as shown in FIGS. 11 and 1.

The first stage is initiated when working piston 134 is advanced into its power stroke by supplying a hydraulic fluid to chamber 130, through combination entry and exit port 138. The fluid exerts sufficient force upon working piston 134 to force rod 106 and the movable die into engagement with the panel. During advancement of piston 134, the air contained in chamber 130 is vented through combination entry and exit port 140 as shown in FIG. 12.

Located within chamber 132 is an intensifier piston 142 having a piston rod 144. The rod 144 extends partway into and is slidably movable through the intermediate plug 128, as illustrated in FIG. 12.

The second stage is initiated when compressed air enters through combination entry and exit port 146 providing a sufficient force against intensifier piston 142 to advance piston rod 144 towards piston 134. As piston rod 144 moves toward piston 134, it passes through a central chamber 148 and closes off further entry of hydraulic fluid through port 128 as shown in FIG. 13. The continued advancement of rod 144 provides additional pressure to the fluid trapped or captured above the piston 134, to advance rod 106 into the second stage. During the second stage rod 106 is further extended outside of the cylindrical housing 122, as shown in FIG. 14 providing sufficient force to pierce the panel and lock the end nut on the panel.

The air contained on the opposite side of piston 142, within chamber 132, is vented during the advancement of the intensifier piston 142 by communicating chambers 130 and 132, by means of a manifold 150. Manifold 150 connects chambers 130 and 132 by means of combination entry and exit port 152, located in the intermediate plug 128, and combination entry and exit port 154, located in plug 124. The air in chamber 132 is vented through port 140 by way of chamber 130.

Pistons 134 and 142 are returned to their initial or return positions, as shown in FIG. 11, by supplying compressed air through port 140, reversing the above disclosed venting procedure.

Figure 15:
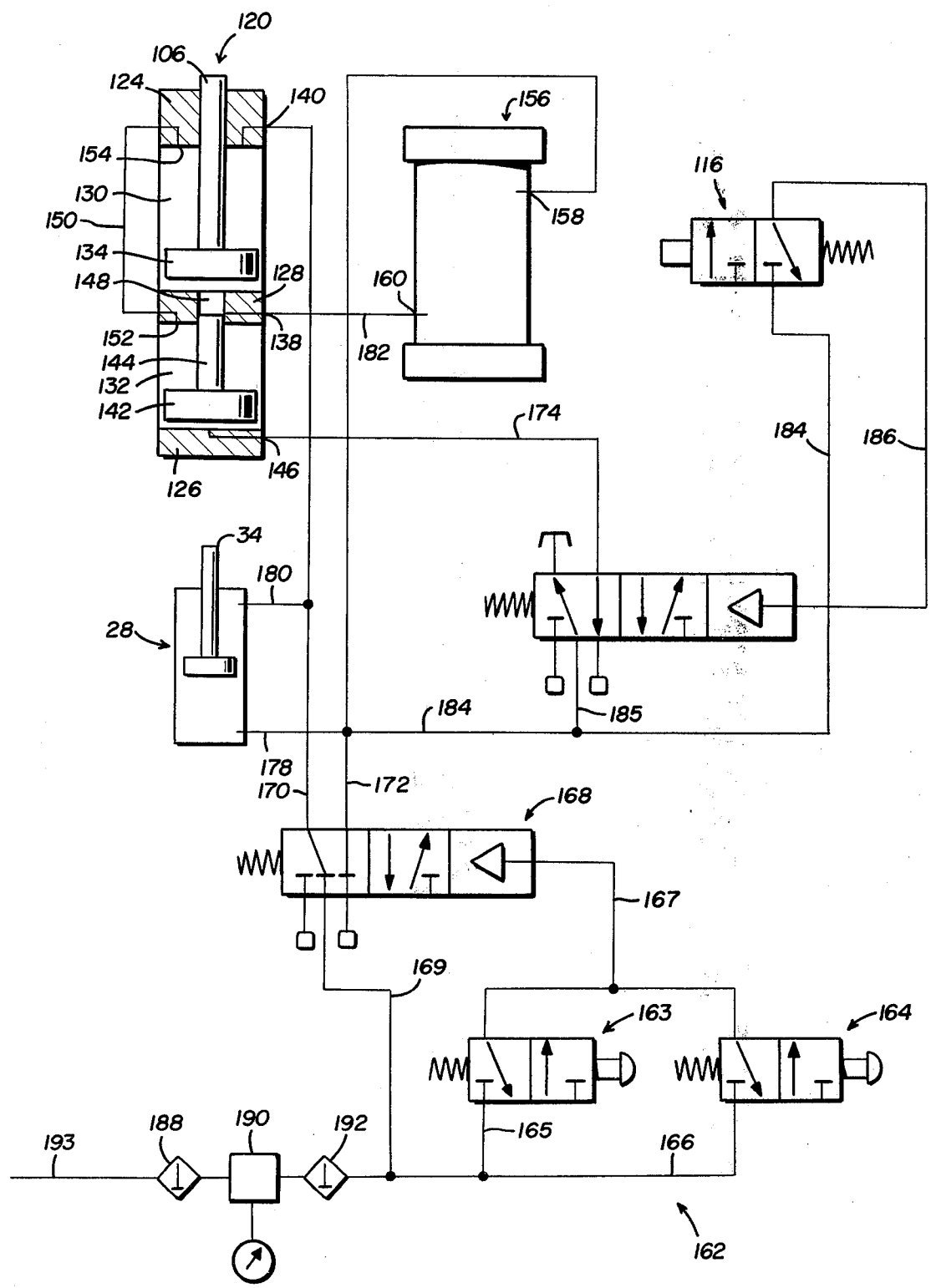
FIG. 15 is a diagrammatic view of the controls used with the apparatus.

An auxiliary component to the above described two stage piston assembly 120 consists of a combination air and oil tank 156, connected to the two stage piston assembly by port 138, as illustrated in FIG. 15. The tank 156 is is closed at both ends and contains a tank piston (not shown). A combination entry and exit port 158 is located near the top of the tank through which compressed air is provided to the tank piston, forcing the hydraulic fluid, contained beneath the piston through combination entry and exit port 160.

The controls of the nut installation apparatus or head 20 as shown in FIG. 15 require a relatively small amount of air for the control and operation of the feed mechanism 22 and two stage piston assembly 120.

The first piston stage and the feeding of nuts may be controlled by a dual palm button starter assembly 162 which includes a pair of valves 163 and 164 as shown in FIG. 15. Air is supplied to the valves 163 and 164 by lines 165 and 166. The simultaneous actuation of the starter by the operator's palms or thumbs, supplies actuating air, by line 167, to a low force valve 168. The requirement of simultaneous actuation incorporates a safety feature into the controls of the apparatus. The safety feature prevents an operator's limbs from entering the C-shaped opening 104 and coming in contact with the movable die 26, nut guide 22 or nut anchor 24 during the first and second stages.

As illustrated in FIG. 15, low force valve 168, is in its unactuated position allowing air, supplied by line 169, to be supplied to the two stage piston assembly 120 through port 140, by line 170, resulting in the assembly 120 attaining a return position. Air is vented from the tank 156 through port 158, by line 172, and vented from the assembly 120 through port 146, by line 174, through high force valve 176. Further, air is also supplied to the feed mechanism 28, by lines 180 and 170, and vented, by lines 178 and 172, resulting in the retraction of feed piston 34. In it actuated position (not shown), air is supplied, by line 172, through port 158 to tank 156 and hydraulic fluid is supplied to the two stage piston assembly 120 through ports 160 and 138, by line 182, resulting in the intitiation of the first stage. Air is also supplied to the feed mechanism, by lines 172 and 178, and vented, by lines 180 and 170, resulting in the advancement of the feed piston rod 34 and a nut 60. Upon completion of the first piston stage the sensor switch 116 is actuated resulting in the initiation of the second stage.

In its unactuated position, as shown in FIG. 15, the air supplied to the sensor switch 116, by lines 172 and 184, is blocked and the air supplied to high force valve 176, by lines 172, 184 and 185, is blocked. Upon actuation of the sensor switch 116, air supplied by lines 172 and 184 actuates high force valve 176, by line 186. The actuation of valve 176, allows air to be supplied to the two stage piston assembly through port 146, by line 174, advancing the intensifier piston 142.

Upon completion of the second stage the control valves return to their unactuated positions, which as disclosed above returns the two stage piston assembly 120 and feed mechanism 28 to their return positions as shown in FIG. 15. These controls are quick which is enabled by the small amount of air employed so that the normal noise and shock of the final piercing is eliminated or substantially so. In the preferred embodiment the controls include an air filter 188, air regulator 190 and air lubricator 192. The lubricator 192 can lubricate, the air supplied by Line 193, by either spraying or vaporizing.

Where the nuts are interconnected by frangible connector means, the initial movement of the nut guide 22, as shown in FIG. 5, breaks the frangible connector means 194 to the end nut 60a, as now described. As described above, the nuts, installed by the nut installation apparatus of this invention, may be in bulk or strip form. The connector means may be integral with the nut or separate connector means may be provided, as shown. In the disclosed embodiment, the nuts are interconnected by frangible wires 194. The method of forming a strip of pierce nuts using frangible wire connectors is disclosed in U.S. Pat. Nos. 3,711,931, and 3,845,860, assigned to the assignee of the instant application. It will be understood that the wires interconnecting the nuts will inititally hold the end nut 60a in the pocket 86 in the nut anchor 24. When the wires are severed, the end nut is supported by the panel 114, as shown in FIG. 6. Where the nuts are in bulk form, the nut anchor 24 may be magnetic to hold the end nut during the installation operation. Alternatively, supporting guide rails may be provided as disclosed in the above patents.

Figure 7:
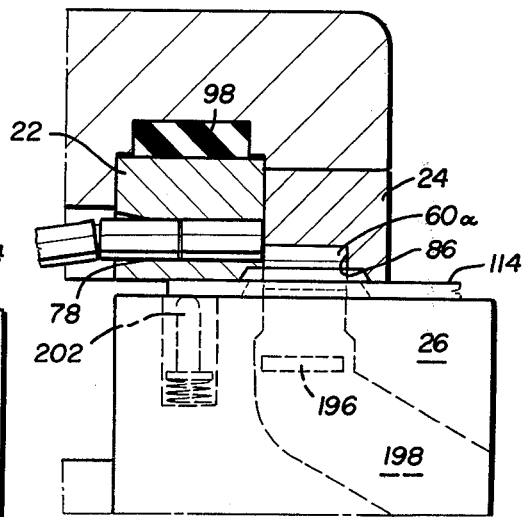
FIG. 7 is a side view of the nut installation head, partially cross-sectioned as shown in FIG. 4, with the die assembly fully seated in the panel, forming the nut and panel assembly shown in FIG. 2.

If the end nut 60a is properly located beneath the nut anchor 24, the sensor switch 116 will be actuated by the inward pressure applied to the sensor knob 118 to actuate the second stage of the piston 106. As described above, the actuation of the second stage will increase the die pressure approximately ten-fold, piercing and deforming the panel as now described in regard to FIGS. 4 to 7. The pilot 62 of the nut pierces the panel 114 and is then received in the opening 107 in the die member 26, within the clinching lips 108 and 110. A slug 196 is thus pierced from the panel, as shown in FIGS. 7, 9 and 10, which is received through the die opening 107, and out through slug channel 198, as shown in FIGS. 1 and 2. The panel is then deformed into the reentrant grooves 68 of the nut by clinching lips 108. The opposed clinching lips 110 provide a further mechanical interlock as shown in FIG. 2 and described in the above-referenced U.S. Pat. No. 3,648,747. It will be understood, however, that the nut installation apparatus of this invention may also be used to install other nut configurations including universal pierce nuts, as disclosed in U.S. Pat. No. 2,707,322.

The final movement of the die 26 fully seats the movable nut guide 22 in the rectangular opening 94 in the housing, as shown in FIG. 7. Recesses 200 are provided in the nut guide and nut anchor to receive the clinching lips 110, as shown in FIG. 9. An optional stripper pin 202 may be included in face of the movable die member 26 to facilitate release of the panel from the die as shown in FIGS. 4, 5, 6 and 7.

The method of attaching nuts to a panel should be apparent from the above description of the nut installation apparatus and controls therefore. Briefly, the method includes supporting a panel 114 on a die member 26, opposite the first or end nut 60a. The end nut is located beneath the nut anchor 24, opposite the panel, as shown in FIG. 4. Where the nuts are received in a strip form, interconnected by frangible connectors 194, the end nut is removed from the strip by biasing the panel 114 against the end nut, lifting the remaining nuts, as shown in FIG. 5. The connectors are cut by the rectangular edge of the nut anchor 24. Continued upward movement of the die 26 pierces the panel with the end nut 60a and deforms the panel into locking engagement with the nut, as shown in FIGS. 5, 6 and 7. In the preferred method of this invention, the initial vertical movement of the nut guide is sensed by sensor and switching mechanism 116, which actuates the final upward movement of the die member, only if a nut 60a is properly seated beneath the nut anchor 24.

The components of the nut installation apparatus of this invention may be formed from conventional steel, such as SAE 6150, including the nut guide 22, the nut anchor 24 and the die member 26. As described above, the resilient pad 98 is preferably formed of a resilient compressible material, such as polyurethane foam. The disclosed embodiment of the nut installation head will install a nut in any suitable panel, including low carbon steels having a thickness of 0.020 to 0.140 inches using the disclosed nut. The nut is preferably formed of a tough resilient steel. Obviously, the panel may also be formed of softer materials, including aluminum, plastic materials, etc. As described above, the installation is relatively quiet, fast and simple. Further, it will be understood by those skilled in the art that various modifications may be made to the installation apparatus and method of this invention. For example, a single stroke piston may be utilized which, however, eliminates some of the unexpected advantages described above. Further, various pierce and clinch nut configurations may be utilized, without modification of the installation apparatus. The sensing circuit may be eliminated, wherein the first and second stage of the piston is separately actuated, which may be accomplished manually.

Having thus described the method and apparatus of this invention, I now claim the invention, as follows:

1. A method of attaching self-locking nuts to a panel, said nuts having a projecting pilot adapted to pierce the panel and mechanically interlock with said panel, the method comprising the following steps:
   (a) supporting said panel on a movable die opposite a stationary nut anchor,
   (b) disposing the end nut of a plurality of serially aligned nuts in said nut anchor opposite said panel with said nut pilot projecting toward said panel,
   (c) moving said die member toward said nut anchor and said panel into engagement with said end nut, flexing said panel and biasing the remaining nuts out of alignment with said end nut and sensing the movement of said remaining nuts relative to said end nut and discontinuing the movement of said die if the relative movement of said remaining nuts indicates that said end nut is not properly located in said nut anchor, thereby preventing fracture of a nut partially located beneath said nut anchor, and
   (d) continuing to move said die and the supported panel into locking engagement with said end nut if said end nut is properly located in said nut anchor, said pilot piercing said panel and locking said end nut on said panel.

2. The method of attaching a nut to a panel defined in claim 1, wherein the contact pressure between said panel and said end nut is initially limited to within the elastic limit of said panel: then, increasing the contact pressure of said panel and said end nut to pierce said panel with said end nut and lock said end nut on said panel.

3. A method of attaching self-locking nuts to a panel, said nuts having a projecting pilot adapted to pierce the panel and mechanically interlock with said panel, the method comprising the following steps:
   (a) supporting said panel on a movable die opposite a stationary nut anchor,
   (b) disposing the end nut of a nut strip interconnected by frangible connector means to a serially aligned strip of nuts between said nut anchor and said panel with said nut pilot projecting toward said panel,
   (c) moving said die member toward said nut anchor and said panel into engagement with said end nut, thereby moving said panel into engagement with said nut strip and severing the frangible connector means to said end nut, and sensing the movement of said nuts relative to said end nut and discontinuing the movement of said die if the relative movement of said strip is insufficient to sever the end nut from said strip, thereby preventing fracture of a nut partially located beneath said nut anchor, and
   (d) continuing to move said die and the support panel into locking engagement with said end nut, said pilot piercing said panel and locking said end nut on said panel.

4. The method of attaching a nut to a panel defined in claim 3, wherein the contact pressure between said panel and said end nut is initially limited to within the elastic limit of said panel until said end nut is severed from said strip: then, increasing the contact pressure of said panel and said end nut to pierce said panel with said end nut and lock said end nut on said panel.

5. A method of attaching nuts to a panel in an apparatus, said nuts each having self-attaching means adapted to form a mechanical interlock with a thin panel upon die pressure engagement of said nuts against said panel, said apparatus having a nut passage configured to receive a plurality of said nuts in serial alignment for attachment to a panel, said method comprising:

(a) supporting said panel on a movable die opposite a stationary nut anchor of said apparatus, said nut anchor having an opening communicating with said passage configured to receive one of said nuts, (b) disposing a plurality of serially aligned nuts in said passage with the first of said nuts located in said nut anchor opening facing said panel, (c) moving said die member toward said nut anchor and said panel into initial contact with said first nut located in said nut anchor and flexing said panel within its elastic limits against said first nut and biasing the remaining nuts in said passage out of alignment with said first nut, (d) sensing the flexural movement of said panel by sensing the movement of said remaining nuts in said passage relative to said first nut confirming that said first nut is properly located in said nut anchor, opposite said panel, and (e) said sensing means further adapted to actuate said die member if said first nut is properly located in said nut anchor, moving said die member under increased pressure to attach said first nut to said panel and form said mechanical nut and panel interlock.

6. An apparatus for securing self-attaching nuts on a panel, said nuts having means adapted to form a mechanical interlock with said panel, said apparatus comprising: a nut guide having a passage for receiving a plurality of said nuts in serial alignment, said nut guide including a bottom wall supporting the nuts received within said passage, a stationary nut anchor located adjacent the end of said nut passage, said nut anchor having a pocket communicating with said nut passage and opening toward said panel, a relatively movable die opposite said nut anchor pocket adapted to support a panel for movement into locking engagement with a nut located between said stationary nut anchor pocket and said panel, and a spring means resiliently supporting said nut guide adapted permitting limited vertical resilient movement of said nut guide, relative to said nut anchor.

7. The apparatus defined in claim 6, including sensing means adapted to sense the position of said nut guide relative to said nut anchor, said sensing means actuating said movable die to increase the contact pressure of said panel against said nut located in said anchor pocket to form a mechanical interlock between said nut and panel.

8. An apparatus for securing self-attaching nuts on a panel, said nuts having a projecting pilot means adapted to form a mechanical interlock with said panel, said apparatus comprising: a nut guide having a passage for receiving nuts, including a bottom wall supporting the nuts received within said passage, a stationary nut anchor located adjacent the end of said nut passage, said nut anchor having an end porton forming a top wall of said nut passage, said nut anchor end portion configured to hold a nut against movement, a relatively movable die opposite said nut anchor end portion adapted to support a panel for movement into locking engagement with a nut located between said stationary nut anchor end portion and said panel, and a spring means resiliently supporting said nut guide adapted to permit limited upward resilient movement of said nut guide, relative to said nut anchor, said nuts being received in said nut passage in a strip of nuts interconnected by frangible connector means, said die supported by a two stage piston means, said piston means first stage adapted to move said die toward said nut anchor to bias said panel into engagement with the end nut of said strip and said nut guide, said panel moving said nut guide relative to said end nut and severing said end nut from said strip, said piston means second stage increasing the pressure of engagement of said panel and said end nut to deform said panel into locking engagement with said end nut.

9. The apparatus defined in claim 8, including a sensing means adapted to sense the position of said nut guide relative to said nut anchor, said piston means first stage limiting the pressure of said die to prevent fracture of a nut partially located beneath said nut anchor, said piston means second stage being actuated by said sensing means only if the end nut is fully located beneath said anchor.

10. The apparatus for securing nuts on a panel defined in claim 9, characterized in that said nut anchor is of generally L-shaped configuration, said nut anchor having a pocket forming part of the top wall and the end of said nut passage, said nut anchor pocket, stopping vertical and forward movement of said end nut, said nut anchor pocket holding said end nut fixed during installation.

11. The apparatus defined in claim 10, including a starting means adapted to require simultaneous actuation by an operator's palms or thumbs, thereby preventing said operator's limbs from coming in contact with said movable die, nut anchor or nut guide during said piston means first and second stages.

12. The apparatus defined in claim 11, including a stripper means adapted to bias said panel away from said movable die upon completion of said piston means second stage.

* * * * *